Figure 1:
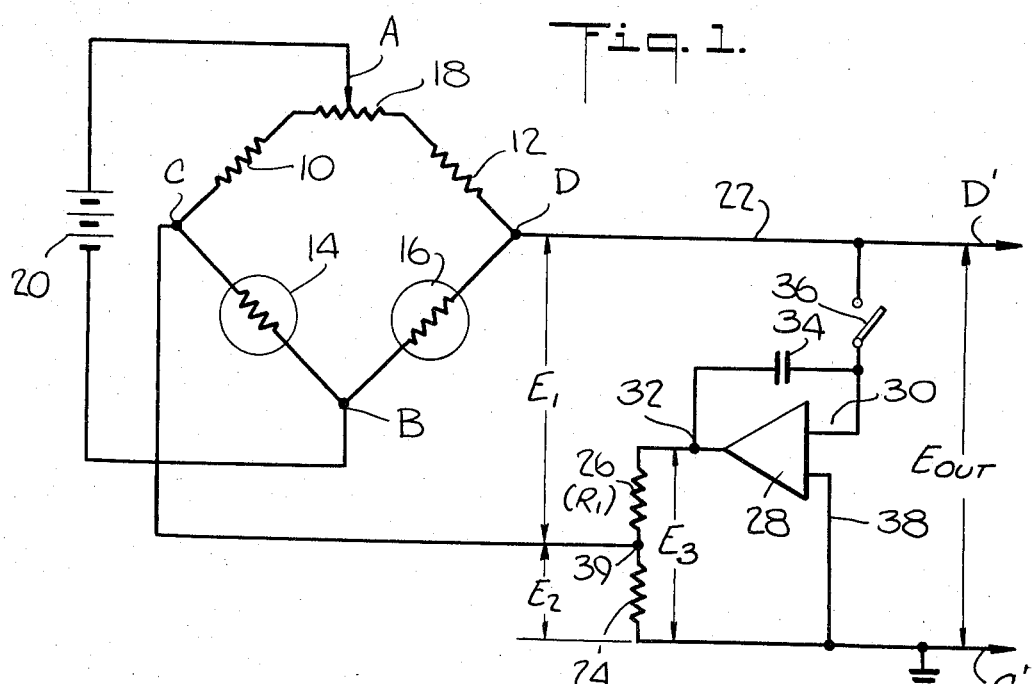

United States Patent Office 3,349,321
Patented Oct. 24, 1967

3,349,321
BRIDGE WITH AUTOMATIC ZERO
Graydon Wells Arksey, Edmonton, Alberta, Canada, assignor to Chemcell Limited, a corporation of Canada
Filed Dec. 24, 1964, Ser. No. 421,050
1 Claim. (Cl. 323—75)

The present invention relates to electrical bridge circuits, and particularly to Wheatstone bridges having one or more resistors whose resistance changes in dependence on a variable condition that is to be monitored or detected.

Wheatstone bridges and similar bridge networks are used for sensing many different physical conditions. When a control condition is considered normal, or when multiple conditions affecting respective sensing components of the bridge are normal, the bridge is balanced. There is a null at its output terminals. Thereafter when one or more sensing components of the bridge change in value, the output terminals provide a signal that should represent the sensed conditions.

The output signal is accurate only to the extent that no extraneous deviations occur to upset the normal balance. From time to time between measurements, the bridge is checked for balance; and where unbalance has occurred, the bridge may be rebalanced. This may be done manually. Rebalancing can also be accomplished automatically, by electromechanical servo systems that sense unbalance and operate a variable bridge component until null returns at the output terminals. Such electromechanical systems entail many objections, being relatively bulky and subject to many problems such as sensitivity, inertia, overshoot, oscillation, backlash, wear, etc.

An object of the present invention resides in providing a new, self-adjusting, purely electrical correction means for establishing an effective zero at the output of a bridge detector system between operations of the bridge to make measurements.

More particularly, an object of the invention is to provide a novel, self-adjusting and stable electrical circuit that is operable between bridge measurements to sense bridge unbalance and automatically restore substantial zero at the bridge system output terminals by a compensating signal.

The foregoing objects and others are achieved by apparatus that is described in detail below and shown in the drawings as an illustrative embodiment of the invention. In this illustrative embodiment, a measurement bridge is provided with a high-gain negative-feedback amplifier having a portion of its output applied to correct deviations from null as sensed between uses of the bridge in making measurements. The amplifier has a storage capacitor that retains a representation of the null error and maintains control over the amplifier during operation of the bridge subsequently when measurements are being made. The amplifier has a negative feedback circuit, which has the important effect of making the amplifier self-adjusting in providing the desired corrective output. As a further particular feature, the capacitor is in the feedback circuit of the amplifier and is charged to a level representing both the null-error signal and the amount of feedback that maintains the amplifier output at the proper level for sustaining the corrective output.

In the exemplary apparatus described in detail below, the corrective signal provided by the amplifier is developed across a resistor that is interposed between a null point of a four-arm bridge and an output terminal of the zero-corrected bridge system. Any "zero-error" signal at the null points of the bridge is thus cancelled at the output terminals by the corrective voltage developed across the interposed resistor.

In the form of bridge detailed below, there are two sensing resistors, each being in series with a respective reference resistor; and these two series circuits are connected in parallel to the terminals of a direct-current energizing supply. In many bridges, only one sensing resistor is used. In another form of bridge, the two condition-responsive resistors are connected in series with each other and to the terminals of a direct-current supply, the junction of the sensing resistors forming one output terminal of the bridge, while the other output terminal of the bridge is a tap in a voltage divider across the direct-current supply. In either of the latter bridges, the zero-correcting voltage produced as above may be interposed at one side of the tap so as to eliminate the zero error. The form of zero-corrected bridge detailed below utilizes the zero-correcting voltage in the output circuit of the bridge to compensate for null error. This does not involve changes in the bridge energizing voltage, an important factor where the calibration curve of the bridge depends critically on the bridge energization, and is preferred.

Figure 2:
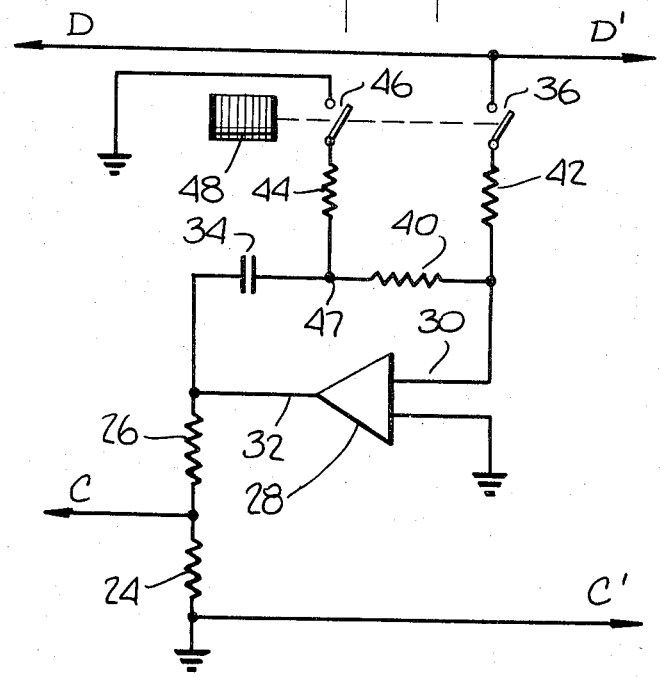

The nature of the invention and further objects and features of novelty will be more fully appreciated from the following detailed description of the illustrative embodiment which is shown in the accompanying drawings. In those drawings:

FIGURE 1 is a wiring diagram of an illustrative embodiment of the invention; and FIGURE 2 is the wiring diagram of a modification of part of FIG. 1.

In FIG. 1 a resistor network in the form of a Wheatstone bridge is illustrated, including reference resistors 10 and 12 and condition-responsive resistors 14 and 16 in the four arms of the bridge. A potentiometer 18 is provided between resistors 10 and 12, and includes a moving contact that can be adjusted for balancing the bridge. A stable source 20 of direct-current energization for the bridge is connected to energizing terminals A and B of the bridge. Measurement resistor 14 and reference resistor 10 are connected in series, as are measurement resistor 16 and reference resistor 12. The respective junctions C and D of these resistor combinations constitute the nominal "null" terminals of the bridge.

In the bridge illustrated, the two condition-responsive or sensing resistors 14 and 16 are in respective arms of the bridge. These sensing resistors may be subjected to a range of variation in their conditions; so long as the conditions sensed by resistors 14 and 16 are the same, the bridge remains balanced. This is a differential sensing bridge, where one resistor 14 may be exposed to a reference condition while the other resistor 16 is subjected to a condition whose deviation from the reference condition is to be observed. This arrangement is found in gas chromatographs, for example, where one resistor is exposed to a flow of pure carrier gas, while the other resistor at the exit of a separating column is exposed to the carrier gas mixed with successive components of the sample being analyzed. The electrical heating of the sensing resistors is differentially dissipated. This effect unbalances the bridge and provides signals representing successive components of the sample.

In the past, a measuring instrument or a recorder or a process control (not shown) has been connected to terminals C and D. The extent of unbalance varies as a function of the condition that caused the unbalance. When the bridge is initially placed in service, potentiometer 18 is adjusted so that measurement apparatus connected to terminals C and D (not illustrated) will register zero when resistors 14 and 16 are both subjected to the same normal conditions. A series of measurements can be made;

but from time to time it is desirable to check terminals C and D for balance. Because of various factors not pertinent here, a certain amount of drift occurs and a significant amount of voltage or zero-error signal may develop at terminals C and D that needs correction. The amount of zero-error signal which thus develops need not be large to be troublesome. For example, in a gas chromatograph circuit using 10 volts for energizing bridge terminals A and B, a residual unbalance of more than 5 microvolts may be objectionable. Through the use of suitable manual adjustments such as potentiometer 18, the bridge output at terminals C and D can be restored to zero. However manual adjustment is not practical under many circumstances, as in application of the bridge to automatic process control.

In FIG. 1, a standard bridge is illustrated to which a zero-correcting circuit has been added.

The zero-corrected or zero-compensated bridge system in FIG. 1 includes main output terminals C' and D'. Terminals D and D' are connected directly by a lead 22, whereas terminals C and C' have a connection which includes resistor 24. A second resistor 26 is connected to resistor 24, these two resistors connected in series, constituting a load resistor of amplifier 28. Between input terminal 30 and output terminal 32 of this amplifier, there is a negative feedback circuit containing a storage capacitor 34. This feedback circuit may include additional components, but capacitor 34 is not shunted by any parallel circuit element that might tend to dissipate the charge that is intentionally stored in the capacitor. Input terminal 30 of the amplifier is connected to line 22 through a switching device 36, such as relay contacts programmed by timer contacts, or the like. Amplifier 28 also has a ground reference connection 38.

Amplifier 28 is an inverting high-grain amplifier that is capable of responding to direct-current input signals at terminal 30 that depart either positively or negatively from the ground reference terminal 38. Amplifiers suitable for this purpose are the so-called operational amplifiers widely used in analog computers. A particularly suitable form of amplifier for this purpose is the chopper stabilized high-grain direct-current amplifier that is disclosed, for example, in an article by E. A. Goldberg, "Stabilization of Wide-Band Direct Current Amplifiers for Zero and Gain" (1950), RCA Review 11 (2), pages 296–300. The amplifier is proportioned so that when terminal 30 is at or near the ground potential of terminal C', the junction 39 of resistors 24 and 26 is also at or near that same potential. Another way of stating this is that the amplifier is adjusted so as to have little or no load current carried by resistors 24 and 26 when input terminal 30 of the amplifier is at ground potential.

The operation of the zero-corrected bridge system in FIG. 1 may now be considered. At the start of operation, with switching device 36 open and amplifier terminal 30 suitably grounded, potentiometer 18 is adjusted so that there is no signal appearing at terminals C' and D'. After this manual adjustment of bridge zero, the apparatus may be used for a period of time. Due to drift that may be expected, the bridge system is no longer balanced. This may be corrected by means of the zero-correcting portion of the circuit.

To rebalance the bridge system automatically (without dependence on a visual check of a zero-error indicator) switching device 36 is closed. Amplifier 28 responds by developing a changed condition in its load resistors 24, 26 such that virtual zero is restored at its input terminals 30, 38. Under these conditions, if the error signal at terminal D' should be a positive deviation from ground, then terminal 32 of amplifier 28 is driven negative, due to the inverting characteristic of this amplifier. The result is that amplifier 28 develops a current in resistor 24 sufficient to produce a voltage that compensates the error signal existing across terminals C and D. The amplifier is self-stabilizing in this condition. The voltage to which capacitor 34 is subjected is that voltage that is appropriate to maintain the error-correcting voltage drop in resistor 24.

Switching device 36 is opened, but the same zero-correcting level of current continues to flow in resistor 24 so long as capacitor 34 retains its charge. This capacitor should be a high-quality low-leakage unit. When resistor 14 or 16 or both of them are subjected to varying conditions, the component of the signal at terminals C and D due to zero error is canceled by the drop across resistor 24 and only the measurement signal appears at terminals C' and D'.

This error-correction arrangement is accurate and stable over a considerable range but, nevertheless, it will be found desirable at intervals to readjust the balancing potentiometer 18. In this way, second-order effects of the zero-correcting circuit on the calibration curves of the bridge can be avoided.

The error-balancing effect of the zero-correcting circuit may be better understood from the following analysis.

In FIG. 1 the bridge error signal reaches ground through resistor $R_2$ so that $$E_{out}=E_1+E_2 \qquad (1)$$

If the input to the operational amplifier is connected to $E_{out}$ (by closing the relay contacts), the output of the operational amplifier will attempt to reach the value $$E_3=-A \times E_{out} \qquad (2)$$

where $A$ is the open-loop gain. However, the resistances $R_1$ and $R_2$ constitute a voltage divider which establishes $$E_2=\frac{E_3 R_2}{R_1+R_2}=\frac{-AR_2}{R_1+R_2} \times E_{out} \qquad (3)$$

Since $E_2$ is part of the feedback loop, this negative voltage is added to $E_1$ (the true bridge error voltage) so that from (1) and (3)

$$E_{out}=E_1 \frac{-AR_2}{R_1+R_2} \times E_{out}=\frac{E_1}{1+\frac{AR_2}{R_1+R_2}} \qquad (4)$$

From (4) it can be seen that with a high amplifier gain $A$, the output voltage can be reduced to a very small fraction of the real error voltage $E_1$, e.g., if $E_1=10$ millivolts, and $A=1,000,000$ (readily attained) and $$\frac{R_2}{R_1+R_2}=\frac{1}{100}$$

(a typical practical value) then $$E_{out}=\frac{10 \ mv.}{10,001}=1.0 \ \text{microvolt}$$

If a storage capacitor is tied between the input and output of the operational amplifier, the amplifier/capacitor system will serve as a "memory" circuit and retain this compensating voltage $E_2$ after the relay contacts open. Loss of $E_2$ can readily be held as low as a few percent per hour in memory circuits of this type, with low leakage capacitors and high gain, high input impedance amplifiers.

FIG. 2 illustrates a detailed modification of the circuit in FIG. 1, for speeding the response of amplifier 28 and its negative feedback circuit to zero-error signal input when switching device 36 is closed, by reducing the time-constants involved. In FIG. 2, the same reference numerals are applied to the same components as those also appearing in FIG. 1, and their description is not repeated here.

A resistor 40 is interposed between capacitor 34 and input terminal 30 of amplifier 28. Another resistor 42 is interposed between switching device 36 and input 30 of amplifier 28. A third resistor 44 is connected to the junction 47 of capacitor 34 and resistor 40, and to normally open switching device 46. Closing of switching device 46 connects resistor 44 to ground. Switching devices 36 and 46 form part of a relay 48 that is normally de-energized.

When the zero-correcting portion of the apparatus is to be brought into effect, manual or programmed means is operated to energize relay 48 and thereby to close switching devices 36 and 46. The entire circuit becomes stabilized in the zero-correcting condition as described in connection with FIG. 1. However, the provision of resistors 40, 42 and 44 reduces the time required for the charge on capacitor 34 to become adjusted to the new conditions. In a practical example, unit 34 is a 2.0 microfarad capacitor with a low-loss synthetic-film dielectric; unit 40 is a 100,000 ohm resistor; each of the two units 42 and 44 is a 4000 ohm resistor; unit 24 is a 100 ohm resistor and unit 26 is a 22,000 ohm resistor.

As has already been indicated, the specific circuit described is presently preferred, and is particularly effective as part of a gas chromatograph. However, there are other applications of the bridge, as well as varied arrangements of the components of the bridge and the zero-correcting network that will be suggested by the above disclosure to those skilled in the art. Consequently, the invention should be construed broadly in accordance with its full spirit and scope.

The embodiments of the invention in which an exclusive property or privilege is claimed are defined as follows:

A zero-compensated condition-responsive bridge system including a normally balanced resistor network subject to zero drift, said network having at least one condition-responsive resistor and having a pair of null terminals that are nominally balanced in the normal condition of said condition-responsive resistor and having a direct-current energizing circuit, said bridge system including a pair of main output terminals, and zero-compensating means between one of said main output terminals and one of said null terminals of said resistor network, said compensating means including an inverting high-gain direct-current amplifier having input terminals including a reference terminal connected to one of the main terminals and including switching means for connecting another amplifier input terminal in common to one of said null terminals and to the other of said main output terminals, said amplifier also having an output circuit and having a negative feedback circuit between said other amplifier input terminal and said output circuit, a drift-signal storage capacitor interposed in said feedback circuit as a part thereof, a first resistor between said other input terminal of the amplifier and said storage capacitor, and a circuit including a further resistor and a switching device connected between said reference terminal of the amplifier and a point in the feedback circuit between said first resistor and said storage capacitor, and coordinated operating means for closing and opening both said switching device and said switching means, and said amplifier including a load resistor interposed in a circuit between said one main output terminal and the other of said pair of null terminals for injecting zero-shift compensation into the bridge system output.

References Cited
UNITED STATES PATENTS

| | | | |
|---|---|---|---|
| 2,856,468 | 10/1958 | Berry | 330—9 X |
| 2,866,018 | 12/1958 | Bell | 330—9 |
| 3,152,301 | 10/1964 | Burk | 330—9 X |
| 3,247,703 | 4/1966 | Burk | 323—75 |

JOHN F. COUCH, *Primary Examiner.*

A. D. PELLINEN, *Assistant Examiner.*